(12) United States Patent  
Keomany et al.

(10) Patent No.: US 9,307,276 B2  
(45) Date of Patent: Apr. 5, 2016

(54) PROCESSING METHOD FOR CONTROL MESSAGES AND SECURITY MODULE TO CARRY OUT SAID METHOD

(71) Applicant: Nagravision S.A., Cheseaux-sur-Lausanne (CH)

(72) Inventors: Jean Keomany, Chavannes-Près-Renans (CH); Daniel Golaz, Bretonnières (CH); Philippe Mazeau, Romagnat (FR); Jean-Luc Bussy, Ecublens (CH); Sébastien Erard, Lausanne (CH)

(73) Assignee: NAGRASTAR, LLC, Englewood, CO (US)

( * ) Notice: Subject to any disclaimer, the term of this patent is extended or adjusted under 35 U.S.C. 154(b) by 0 days.

(21) Appl. No.: 14/501,262

(22) Filed: Sep. 30, 2014

(65) Prior Publication Data

US 2015/0106834 A1 Apr. 16, 2015

(30) Foreign Application Priority Data

Oct. 10, 2013 (EP) .................................... 13188147  
Jun. 13, 2014 (EP) .................................... 14172364

(51) Int. Cl.
*H04N 21/4623* (2011.01)  
*H04N 21/254* (2011.01)  
(Continued)

(52) U.S. Cl.
CPC .......... *H04N 21/2541* (2013.01); *G06F 9/4881* (2013.01); *H04N 21/4181* (2013.01); *H04N 21/4623* (2013.01)

(58) Field of Classification Search
CPC ..... H04N 7/167; H04N 7/00; H04N 21/4623; H04N 21/4331; H04N 5/4384  
See application file for complete search history.

(56) References Cited

U.S. PATENT DOCUMENTS

2006/0085828 A1    4/2006  Dureau et al.  
2007/0234395 A1*  10/2007  Dureau et al. ................. 725/135

(Continued)

FOREIGN PATENT DOCUMENTS

EP       1705915 A1    9/2006

OTHER PUBLICATIONS

"Ordonnancement temps réel." Retrieved from the Internet: http:197/14/51/10:81/pbm/collections/Techniques de lingenieur/itcd5/s/S3/s8055.pdf (Dec. 31, 2000).

(Continued)

*Primary Examiner* — Mark D Featherstone  
*Assistant Examiner* — Susan X Li  
(74) *Attorney, Agent, or Firm* — Merchant & Gould P.C.

(57) ABSTRACT

The present invention concerns a method for processing messages intended to allow the access to conditional access content and to a security module arranged for implementing this method. The method comprises the steps of receiving by a security module comprising at least one decryption module, a plurality of messages, these messages belonging to at least two different categories; assigning a different priority level to messages from each different category, one of said priority level being defined as high and another priority level, lower that the high priority level, being defined as the standard priority level; associating a value to the messages to which the standard priority level has been assigned; assigning at least one threshold value for the value associated with messages having a standard priority level; and comparing between the threshold value for a determined message and the value associated with said message. If no value associated with said message having standard priority level exceeds the corresponding threshold value, processing the messages according to their priority level, a message to which the high priority level has been assigned being processed before a message to which a lower priority level has been assigned, and change of the value associated with the messages having a standard priority level according to said predefined rule. If the value associated with one of said messages having a standard priority level exceeds the threshold value for the corresponding message, processing one of the messages having a standard priority level before processing a message having a higher priority level, and change of the value associated with the messages having a standard priority level according to said predefined rule.

21 Claims, 6 Drawing Sheets

| SC  | 1st  |      |      |      |
|-----|------|------|------|------|
| Std | E2   | E3   | E4   |      |
| Rk  | 1    | 2    | 3    | 4    |
| AWT | 2420 | 920  | 420  |      |
| EWT | 2420 | 1170 | 920  |      |
| TV  | 3000 | 3000 | 3000 |      |
| RT  | 580  | 2080 | 2580 |      |

(51) Int. Cl.
*G06F 9/48* (2006.01)
*H04N 21/418* (2011.01)

(56) References Cited

U.S. PATENT DOCUMENTS

2010/0318768 A1* 12/2010 Bouillet et al. ............... 712/203
2013/0344803 A1* 12/2013 Isu et al. ......................... 455/39

OTHER PUBLICATIONS

European Search Report dated Jan. 27, 2015 issued in corresponding European Application No. 14172364.3.
European Search Report dated Jan. 27, 2015, issued in corresponding European Patent Application No. 14172364.3, 5 pages (English Translation).

* cited by examiner

| SC | 1st |   |   |   |   |   |
|----|-----|---|---|---|---|---|
|    | 2nd |   |   |   |   |   |
| A  | Std | B | C | D | E |   |
|    | Ct  | 2 | 3 | 4 | 5 |   |

Fig. 1a

| SC | 1st | G |   |   |   |   |
|----|-----|---|---|---|---|---|
|    | 2nd | H |   |   |   |   |
| A  | Std | B | C |   |   |   |
|    | Ct  | 2 | 3 |   |   |   |

Fig. 1b

| SC | 1st |   |   |   |   |   |
|----|-----|---|---|---|---|---|
|    | 2nd | H |   |   |   |   |
| G  | Std | B | C |   |   |   |
|    | Ct  | 3 | 4 |   |   |   |

Fig. 1c

| SC | 1st |   |   |   |   |   |
|----|-----|---|---|---|---|---|
|    | 2nd |   |   |   |   |   |
| H  | Std | B | C |   |   |   |
|    | Ct  | 4 | 5 |   |   |   |

Fig. 1d

| SC | 1st |   |   |   |   |   |
|----|-----|---|---|---|---|---|
|    | 2nd |   |   |   |   |   |
| B  | Std | C |   |   |   |   |
|    | Ct  | 5 |   |   |   |   |

Fig. 1e

| SC | 1st | | | | |
|---|---|---|---|---|---|
| | 2nd | | | | |
| A | Std | B | C | D | E |
| | Ct | 2 | 3 | 4 | 5 |

Fig. 2a

| SC | 1st | | | | |
|---|---|---|---|---|---|
| | 2nd | F | | | |
| E | Std | B | C | E | |
| | Ct | 2 | 3 | 4 | |

Fig. 2b

| SC | 1st | | | | |
|---|---|---|---|---|---|
| | 2nd | G | | | |
| F | Std | B | C | E | |
| | Ct | 3 | 4 | 5 | |

Fig. 2c

| SC | 1st | | | | |
|---|---|---|---|---|---|
| | 2nd | H | | | |
| G | Std | B | C | | |
| | Ct | 4 | 5 | | |

Fig. 2d

| SC | 1st | | | | |
|---|---|---|---|---|---|
| | 2nd | I | | | |
| H | Std | B | C | | |
| | Ct | 5 | 6 | | |

Fig. 2e

| SC | 1st | | | | |
|---|---|---|---|---|---|
| | 2nd | I | | | |
| B | Std | C | | | |
| | Ct | 6 | | | |

Fig. 2f

| SC | 1st | | | | |
|---|---|---|---|---|---|
| | 2nd | I | | | |
| C | Std | | | | |
| | Ct | | | | |

Fig. 2g

| SC | 1st |   |   |   |   |   |
|----|-----|---|---|---|---|---|
|    | 2nd |   |   |   |   |   |
| A  | Std | B | C | D | E |   |
|    | Ct  | 2 | 3 | 4 | 5 |   |

Fig. 3a

| SC | 1st | G |   |   |   |   |
|----|-----|---|---|---|---|---|
|    | 2nd | H |   |   |   |   |
| A  | Std | B | C |   |   |   |
|    | Ct  | 2 | 3 |   |   |   |

Fig. 3b

| SC | 1st | K |   |   |   |   |
|----|-----|---|---|---|---|---|
|    | 2nd | H | L |   |   |   |
| G  | Std | C |   |   |   |   |
|    | Ct  | 3 |   |   |   |   |

Fig. 3c

| SC | 1st |   |   |   |   |   |
|----|-----|---|---|---|---|---|
|    | 2nd | H | L |   |   |   |
| K  | Std | C |   |   |   |   |
|    | Ct  | 4 |   |   |   |   |

Fig. 3d

| SC | 1st |   |   |   |   |   |
|----|-----|---|---|---|---|---|
|    | 2nd | L | M |   |   |   |
| H  | Std | C |   |   |   |   |
|    | Ct  | 5 |   |   |   |   |

Fig. 3e

| SC | 1st |   |   |   |   |   |
|----|-----|---|---|---|---|---|
|    | 2nd | M |   |   |   |   |
| H  | Std | C |   |   |   |   |
|    | Ct  | 6 |   |   |   |   |

Fig. 3f

| SC | 1st |   |   |   |   |   |
|----|-----|---|---|---|---|---|
|    | 2nd | M |   |   |   |   |
| C  | Std |   |   |   |   |   |
|    | Ct  |   |   |   |   |   |

Fig. 3g

| SC | 1st |   |   |   |   |   |
|----|-----|---|---|---|---|---|
|    | 2nd |   |   |   |   |   |
| A  | Std | B | C | D | E |   |
|    | Ct  | 2 | 3 | 4 | 5 |   |

Fig. 4a

| SC | 1st |   |   |   |   |   |
|----|-----|---|---|---|---|---|
|    | 2nd | K | L | M |   |   |
| A  | Std | C | D |   |   |   |
|    | Ct  | 2 | 3 |   |   |   |

Fig. 4b

| SC | 1st |   |   |   |   |   |
|----|-----|---|---|---|---|---|
|    | 2nd | L | M |   |   |   |
| K  | Std | C | D |   |   |   |
|    | Ct  | 3 | 4 |   |   |   |

Fig. 4c

| SC | 1st |   |   |   |   |   |
|----|-----|---|---|---|---|---|
|    | 2nd |   |   |   |   |   |
| L  | Std | C | D |   |   |   |
|    | Ct  | 4 | 5 |   |   |   |

Fig. 4d

| SC | 1st |   |   |   |   |   |
|----|-----|---|---|---|---|---|
|    | 2nd |   |   |   |   |   |
| M  | Std | C | D |   |   |   |
|    | Ct  | 5 | 6 |   |   |   |

Fig. 4e

| SC | 1st |   |   |   |   |   |
|----|-----|---|---|---|---|---|
|    | 2nd |   |   |   |   |   |
| C  | Std | D |   |   |   |   |
|    | Ct  | 6 |   |   |   |   |

Fig. 4f

| SC | 1st |   |   |   |   |   |
|----|-----|---|---|---|---|---|
|    | 2nd | N |   |   |   |   |
| C  | Std | D |   |   |   |   |
|    | Ct  | 6 |   |   |   |   |

Fig. 4g

| SC | 1st |   |   |   |   |   |
|----|-----|---|---|---|---|---|
|    | 2nd | N |   |   |   |   |
| D  | Std |   |   |   |   |   |
|    | Ct  |   |   |   |   |   |

Fig. 4h

| SC | 1st | G | H | I | |
|---|---|---|---|---|---|
| | Std | B1 | C1 | B2 | C2 |
| A | AWT | 2800 | 2000 | 500 | 0 |

Fig. 5a

| SC | 1st | H | I | | |
|---|---|---|---|---|---|
| | Std | B1 | C1 | B2 | C2 |
| G | AWT | 3020 | 2220 | 720 | 220 |

Fig. 5b

| SC | 1st | H | I | | |
|---|---|---|---|---|---|
| | Std | C1 | B2 | C2 | |
| B1 | AWT | 2420 | 920 | 420 | |

Fig. 5c

| SC | 1st | I | | | |
|---|---|---|---|---|---|
| | Std | C1 | B2 | C2 | |
| H | AWT | 2650 | 1150 | 650 | |

Fig. 5d

| SC | 1st | | | | |
|---|---|---|---|---|---|
| | Std | E2 | E3 | E4 | |
| | Rk | 1 | 2 | 3 | 4 |
| | AWT | 2420 | 920 | 420 | |
| | EWT | 2420 | 1170 | 920 | |
| | TV | 3000 | 3000 | 3000 | |
| | RT | 580 | 2080 | 2580 | |

Fig. 6a

| SC | 1st | | | | |
|---|---|---|---|---|---|
| | Std | E2 | F2 | E3 | E4 |
| | Rg | 1 | 2 | 3 | 4 |
| | AWT | 2420 | 0 | 920 | 420 |
| | EWT | 2420 | 250 | 1420 | 1170 |
| | TV | 3000 | 2000 | 3000 | 3000 |
| | RT | 580 | 2000 | 2080 | 2580 |

Fig. 6b

PROCESSING METHOD FOR CONTROL MESSAGES AND SECURITY MODULE TO CARRY OUT SAID METHOD

CROSS-REFERENCE TO RELATED APPLICATIONS

This application claims priority under 35 U.S.C. §120 to, European Application No. 13188147.9, filed Oct. 10, 2013, and further claims priority under 35 U.S.C. §120 to European Application No. 14172364.3, filed Jun. 13, 2014.

TECHNICAL FIELD

The present invention relates to a method for processing messages intended to allow the access to conditional access content.

More particularly, this method concerns the management of priorities when several messages are received in a short period of time and must be processed according to a certain order for allowing the access to content.

This method is particularly adapted to the context of Pay-TV.

The present invention further concerns a security module provided for implementing this method.

BACKGROUND ART

The transmission of encrypted data or of conditional access content is well-known in the field of Pay-TV, where encrypted content is generally broadcast by terrestrial transmitters, via satellite or via a cable network to a number of subscribers, each subscriber having a multimedia unit, associated with or containing a security module to decrypt the encrypted content for its visualization.

The security module is in charge of the security operations and is associated with the multimedia unit or with a receiver. Such a security module comprises, on the one hand, a conditional access module referred to as CAK (Conditional Access Kernel), and on the other hand, a processing module. The conditional access module is in charge of the management of priorities of the messages that will be processed by the processing module. This processing module carries out the verification and/or the authentication steps, and is also responsible for processing the messages transmitted to it and for resending the results of this processing. Such a processing module can be made particularly in four different forms. One of these forms is a microprocessor card, a chip card, or more generally an electronic module (in a form of a key, a badge, . . . ). Such a module is usually removable and connectable to the receiver. The form with electric contacts is the most commonly used, but does not exclude a connection without contacts, for instance of the ISO 14443 type.

A second well-known form is that of an integrated circuit box, usually located in a definitive and irremovable way in the receiver box. A variant consists of a circuit mounted on a base or a connector such as a SIM module connector.

In a third form, the processing module is integrated in an integrated circuit box further having another function, for instance in a descrambling module of the decoder or the microprocessor of the decoder.

In a fourth embodiment, the processing module is not made in material form, but its function is only implemented as a software.

As in all four cases, even though the security level differs, the function is identical, we will refer to as a processing module regardless of the way in which its function is implemented or the form of this module. In the four above described forms, the processing module has means for executing a program (CPU) stored in its memory. The collaboration between the conditional access module (CAK) and the processing module allows the security module to perform the security operations, to verify rights, to perform a decryption or to activate a decryption module, etc.

In a system of the Pay-TV type, the scrambled or encrypted content can be descrambled or decrypted by a control word. In order to improve the security of the system, the control word is generally changed within a relatively short interval, called cryptoperiod, for example of ten-seconds. Every 10 seconds, or for each cryptoperiod, each subscriber receives, in an ECM control message (Entitlement Control Message), the control word required for decrypting the enciphered contents in order to allow the viewing or the access to the transmitted data. During the time of one cryptoperiod, a same control message or control messages containing the same control words are sent at regular intervals, for instance every 50 ms. This repetition of messages allows a user that switches on a specific channel to access control words that are required for decrypting the content of the specific channel without having to wait until the end of the cryptoperiod.

The control word itself is encrypted by a transmission key and is transmitted in an encrypted form in the ECM control message. The encrypted content and the encrypted control word are received by a multimedia unit which, if the subscriber is up-to-date with its subscription, or more generally, if he has the corresponding access rights, has access to the usage key stored in a security module. The encrypted control word is decrypted by the security module by means of the transmission key. The security module transmits the control word to the decoder. The encrypted content is decrypted by the decoder by means of the control word.

The transmission key is regularly changed, for instance, every month. A management message (EMM Entitlement Management Message) is received every month by the decoder and transmitted to the security module. The management message contains the transmission key in an encrypted form. A key assigned to the security module allows the latter to decrypt the encrypted transmission key.

The security modules currently used for processing the control messages mainly have a limited processing capacity. In particular, the processing module can only process one message at a time, which involves a storage and a sequential processing of the messages when several messages are received by a multimedia unit in a short period of time. Recently, the manufacturers of decoders intended to the Pay-TV or to conditional access TV have introduced broadband tuners that are able to receive a significant number of content and message streams, for instance, 8, 16, 32 or even more. This can be a problem. Indeed, when too many messages are received simultaneously or during a relatively short period, the security module might not be able to process all the messages received. This results in the risk that part of the content cannot be decrypted and that the user is presented with a blank screen. This might be the case, in particular, when the management of the processing order of the messages is not well done.

Presently, this problem is solved by assigning a priority to the messages, this priority being defined according to the real or possible use of the messages by a user. As an example, the message stream, corresponding to a content that is being viewed by a user, receives the highest priority, in order to avoid that a control message cannot be decrypted and that the user is presented with a blank screen.

The stream corresponding to a content being recorded also has a high priority level, otherwise, there is a risk that a part of the recording may not be performed.

The predictive stream or streams have a lower priority. These predictive streams correspond to the channels for which the probability that the user will view this channel is the highest. These channels may be the channels having a channel number immediately adjacent to the channel that is being viewed. They can also be defined according to the user's profile.

Usually, when the security module must process at the same time, a stream corresponding to the content displayed, a stream for a content that is currently recorded and predictive streams, the security module is strongly requested and the management of other streams can be a problem. In cases in which a patchwork is displayed for a user, with the current systems, the content forming this patchwork results from a specific channel. Indeed, in the current systems, it is not possible for instance, to decrypt enough messages for displaying a patchwork on the basis of the real content. For this reason, it is indispensable to use a specific channel. The priority for this kind of channels can be relatively low, and this may cause problems such as the impossibility to display the mosaic. Moreover, it is not possible to offer a customized patchwork to the users.

In the prior art systems, priorities are fixed. Thus, in certain situations, the user can find himself facing a blank screen. This could be the case, in particular, when the user frequently switches and when the security module cannot process all the control messages received.

This present invention aims to solve the drawbacks of the prior art by implementing a method for processing control messages, which allows to manage these messages in a more flexible and more effective way. These drawbacks are also solved by a security module used for the implementation of this method for processing messages.

DISCLOSURE OF THE INVENTION

The aim of the invention is reached by a method for processing messages intended to allow the access to conditional access content, characterized in that it comprises the following steps:
  receiving a plurality of messages by a security module comprising at least one conditional access module (CAK) and a processing module, these messages being classified into at least two different categories;
  assigning a different priority level to the messages from each different category, one of said priority levels being defined as being high, and another priority level, lower than the high priority level, being defined as standard priority level;
  associating a value to the messages to which the standard priority level has been assigned, this value being assigned according to a predefined rule;
  assigning at least one threshold value for the value associated with the messages having a standard priority level;
  comparing the threshold value for a determined message and the value associated with said message;
  if no value associated with said standard priority level messages exceeds the corresponding threshold value, processing the messages according to their priority level, a message to which the high priority level has been assigned being processed before a message to which a lower priority level has been assigned, and change of the value associated with the standard priority level messages according to said predefined rule;
  if the value associated with one of said standard priority level messages exceeds the threshold value for the corresponding message, processing one of the standard level messages before processing a message having a higher priority level, and change of the value associated with the standard priority level messages according to said predefined rule.

The aim of the invention is also reached by a security module comprising at least one conditional access module (CAK), means for receiving messages classified into at least two different categories and a processing module (SC) for these messages, a different priority level being assigned to the messages of each different category, one of said priority levels being defined as being high and another priority level, smaller than the high priority, being defined as standard priority level; a value being associated with the messages to which the standard priority level has been assigned, this value being assigned according to a predefined rule; a threshold value being assigned to the value associated with the messages having a standard priority level, this security module being characterized in that it further comprises means for comparing the threshold value for a specific message and the value associated with said specific message, and means for processing the messages according to their priority level, wherein:
  if no value associated to said standard priority level messages exceeds the corresponding threshold value, the messages are processed according to their priority level, a message to which the high priority level has been assigned being processed before a message to which a lower priority level has been assigned, and in which the value associated to the messages having a standard priority level is changed according to said predefined rule;
  if the value associated to one of said standard priority level messages exceeds the threshold value for the corresponding message, one of the messages having a standard level is processed before a message with a higher priority level, and the value associated to messages having a standard priority level is changed according to said predefined rule.

According to the method of the invention, the processing of the control messages is carried out in a flexible and effective way so that the user does not have any inconvenience. This method is implemented in a security module comprising at least one processing unit and cooperating with at least one memory. This memory can be integrated in the security module or located into another device. The security module cooperates with a multimedia unit or is part of such multimedia unit. In the following description, we will assume that the multimedia unit is formed by a receiver-decoder and a security module cooperating with this receiver-decoder.

According to this invention, the method for processing control messages ensures an optimal processing that takes into account the limitations imposed by the processing capacities of the security module.

According to this method, the messages are not processed according to a fixed and pre-established priority, the message control is rather made in a flexible manner, depending on circumstances. In particular, the order for processing the messages depends on the moment when the multimedia unit will really need the content of the message to be processed.

According to one embodiment, it is possible, for instance, to provide that the first control message (ECM) received for each channel is associated with a high priority level, that the following control messages for the same channels have a priority level lower than the high level, that control messages for predictive channels are classified in an even lower priority level category and that the management messages EMM are associated with an even lower priority. This invention defines a "basic" management, according to which messages are processed starting with the messages having the highest priority, then pursuing the process with the messages of lower and lower priority level. This "basic" management can not be respected when certain conditions are met, these conditions usually involving a risk that a message corresponding to a content currently viewed or being recorded, cannot be deciphered in time in order to ensure a complete decryption of the event. The priority inversion remains valid as long as the conditions of this inversion are fulfilled. When these conditions are no more fulfilled, the processing order corresponding to the basic management is followed again.

BRIEF DESCRIPTION OF THE DRAWINGS

The present invention and its advantages will be better understood with reference to the enclosed drawings and to the detailed description of particular embodiments, wherein:

FIGS. 1a to 1e show a first embodiment of the invention;

FIGS. 2a to 2g show a second example of management of messages according to this invention;

FIGS. 3a to 3g illustrates a third example of an execution of a method according to the invention;

FIGS. 4a to 4h illustrates a fourth example of an execution of a method according to the invention;

FIGS. 5a to 5d illustrates a fifth example of an execution of a method according to the invention; and FIGS. 6a and 6b disclose a sixth example of a way in which a method according to the invention may be carried out.

MODES FOR CARRYING OUT THE INVENTION

The present invention relates to a method for processing messages intended for Pay-TV, in particular for control messages containing at least one control word (CW Control Word) allowing the decryption of encrypted content and accordingly, the visualization of conditional access content. The method of the invention also enables processing other types of messages such as management messages (EMM; Entitlement Management Messages), impulsive management messages (IEMM, Impulsive Entitlement Management Messages), used in particular for purchasing products, or even other types of messages.

This processing method is implemented in a security module comprising a conditional access module and a processing module, this security module being part of a multimedia unit. The multimedia unit or its receiver portion receives a stream of encrypted content. The security module receives a stream of control messages ECM from the receiver. This security module is in particular in charge of the processing of the control messages received, the process involving the verification of the access rights, and if the access rights are present and valid, the decryption of the message so as to extract the control word(s). When a control word is decrypted, it is transmitted to a descrambling module of the decoder that uses this control word to decrypt the content and to display it in order to be viewed.

FIGS. 1 to 6 schematically illustrate a security module SC comprising at least a memory and a processing unit. The memory can be unique and can comprise several areas, each corresponding to different memorized data. It is also possible to provide several memories, each of them storing different data. A combination of both variants is also possible. In the following description, it is assumed that the security module comprises a single memory, divided into several areas.

According to a variant, the functions of the security module can be carried out by an application. In this case, the security module cooperates with a memory which is not part of this security module.

In FIGS. 1 to 4, three memory areas are associated with control messages, each zone of the memory corresponding to a different priority level. A fourth zone of the memory corresponds to a counter whose function is explained in more detail below.

In the example illustrated by FIG. 1, the security module is responsible for processing messages corresponding to several channels referred to as A, B, C, D, E, G and H.

Three priority levels are associated with the control messages. These levels are referred to as 1st for the highest priority level, as 2nd for the medium priority level and as Std for the lowest priority level.

The lowest priority level, referred to as Std, is called standard level. The priority level referred to as 1st corresponds to a high priority and the priority level referred to as 2nd corresponds to a medium priority. The priority levels different from standard level, i.e., in this example, the high and medium levels, only receive first control messages for a specific channel. A first message is the first message that arrives when the conditions just change. Such a first message arrives in particular when the user has changed the channel.

In cases in which the system receives messages corresponding to predictive channels, a first message will be sent for the channel to which the user is connected to, as well as on predictive channels linked to this new channel viewed by the user. These first messages are all memorized in memories associated with the high (1st) and medium (2nd) security levels. More specifically, the first message corresponding to the channel to which the user has just switched is usually stored in the memory area associated with the high priority level and the first messages corresponding to the predictive channels are usually stored in the memory area associated with the medium priority level. When the security module receives following messages for these channels, these messages different from the first messages are memorized in a memory area corresponding to a standard priority level. In the embodiments illustrated by FIGS. 1 to 4, the messages are memorized in a chronological order, the most recent messages being illustrated on the right portion of the figures and the oldest messages in the left portion.

The following description is made on the basis of the examples shown by FIGS. 1 to 6. It is clear that these examples are used to help understanding the principle of the invention, but that they are not limitative.

In these figures, the reference SC corresponds to the security module and more specifically to the processing module which is in charge of the processing of the control messages. The character found under the reference SC corresponds to the channel for which a message is being processed. The horizontal lines correspond to a priority level, a determined priority level can be associated with a memory area in which the messages are stored before processing. These messages are processed, for each horizontal line, according to the First In First Out principle, the first message stored, i.e., the one shown on the left in the figures, being processed first.

In the state shown in FIG. 1a, showing the initial state of the security module SC, the processing module processes the message corresponding to a channel referred to as A. The memory of the standard priority level Std of the security module contains a message B corresponding to a first channel, a message corresponding to a second channel referred to as C, a message corresponding to a third channel referred to as D and a message corresponding to a fourth channel referred to as E.

The messages located in this memory area and corresponding to the standard priority level, are not first messages. The value of the message counter for channel B is 2, this value being defined as follows. A message (A) has been processed since the reception of the message B by the security module. The number of messages processed is equal to 1. The rank of the message B in the memory corresponding to the standard level is 1 as this is the first message of the queue corresponding to this priority level. The value associated with the message B is equal to the sum of these two values, 1+1=2.

The message of channel C is associated with the value 3 that corresponds to the sum of 1 (number of messages processed from the reception of message C) and 2 (rank of the message C in the standard level memory). The message of channel D is associated with the value 4 and the message E of channel E is associated with the value 5.

A counter threshold value is also set. The latter is for instance equal to 5 in the example used. This value is known to the security module and/or to the processing module.

Let us assume that the user switches from channel D to channel G. The first message from channel G is located in the memory corresponding to the high priority. The channel H being a predictive channel (on which the user is very likely to switch), the first message for this channel is stored in the memory corresponding to the medium priority level. Since messages referred to as D, that correspond to the channel previously viewed by the user, as well as E that was a predictive channel, are no more useful, the corresponding messages are deleted. This is shown by FIG. 1b.

In FIG. 1c, the message G corresponding to the highest priority is processed by the processing module. When the processing module has processed a message, the counter value is changed according to a pre-established rule. In the examples of FIGS. 1 to 4, this pre-established rule consists in increasing the counter value for one unit for each message processed. As a message has been processed, the counter value associated with the standard priority level messages is incremented by 1, which results in a value of 3 for the message B corresponding to channel B and of 4 for the message C of channel C.

In the situation corresponding to FIG. 1d, the message of channel H is processed in the processing module. The counter value for the message B of channel B is incremented by 1, which results in a value of 4. In a similar way, the value for channel C reaches 5. As these values are lower or equal to the threshold value (5), the conventional processing will continue.

In the step corresponding to FIG. 1e, since the memory areas corresponding to high and medium priority levels are void, the first message of the memory of standard level Std, i.e., B, is processed and the message processing will continue in a conventional way.

In the example disclosed by FIGS. 2a to 2g, the initial situation is identical to that shown by FIG. 1. The user switches from channel D to channel E that was a predictive channel. In this case, F becomes a new predictive channel and the first message from channel F is stored in the memory corresponding to the medium priority level (2nd). This is shown by FIG. 2b. The user thus switches on channel F, the channel G becoming a predictive channel. The first message from channel G is stored in the memory corresponding to the medium priority level 2nd while the processing module processes the message from channel F. The counter value associated with the messages of standard level Std is incremented due to the fact that the message F has been processed. This value becomes 3 for B, 4 for C and 5 for E. This can be seen on FIG. 2c.

In FIG. 2d, the user switches from channel F to G, the channel H becoming a predictive channel. The message G is processed and the counter value for B and C respectively increases to 4 and 5.

The user thus switches on channel H and receives a message corresponding to the channel I as the predictive channel. This is illustrated by FIG. 2e. The message I is stored in the memory corresponding to the medium priority level 2nd and the counter values are incremented in order to set B to 5 and C to 6. The threshold value being 5 and the counter value for C being higher than this threshold value, the first message of the memory corresponding to the standard level Std is processed, before the message I corresponding to a higher priority level compared to the standard level. The message B will thus be processed in the processing module. The counter value for the message C will remain higher than the threshold value. Thereby, the message C will be processed in the processing module, before the message I corresponding to the medium security level. This is illustrated on FIGS. 2e and 2f.

In FIG. 2g, the standard level no longer contains messages associated with a counter value higher than the threshold value. The message having the highest security level, in this case I, can thus be processed in the processing module.

The fact that a message from the standard priority level has a higher value than the threshold value results in initiating the processing of a standard priority level message, before processing a higher priority level message. It should be noted that the message having initiated the change of priority is not necessarily the message processed, but the first message of the queue or of the memory area corresponding to the standard level. In the example shown on FIG. 2e, the fact that the counter value associated to a message C is higher than the threshold value results in modifying the priority order. However, the following message processed is the message B, associated with a value equal to the threshold value, and not the message C, associated with a higher value and having initiated the change of priority.

In the embodiment shown in FIGS. 3a to 3g, two users share the same security module. The second user switches from channel D to channel G while the first user switches from channel A to channel K. The first message from channel G is stored in the memory corresponding to the high level while the message corresponding to the predictive channel H is stored in the memory corresponding to the medium level. This is shown on FIG. 3b. The message from channel K is then stored in the memory corresponding to the high level while the message G is processed by the processing module. This corresponds to FIG. 3c. The counter value for the message C is increased and the messages having the highest priority level are processed. These messages are K, H and L in that order. This corresponds to FIGS. 3d and 3e. When these messages have been processed, as illustrated by FIG. 3f, the counter value for C is equal to 6, which is higher than the threshold value. The first message having a standard priority level, herein the message C, will thus be processed as a priority, before the message M having a higher priority level. This is shown in FIG. 3g.

In the embodiment illustrated by FIGS. 4a to 4h, the user unit receives messages for allowing to achieve a mosaic. These messages correspond to the channels K, L and M. As disclosed by FIGS. 4b to 4e, the messages K, L and M are processed before the counter value for the messages f the standard level exceeds the threshold value. This threshold value is exceeded after processing the message M shown in FIG. 4e. When the security module receives a new message N, having a medium priority level, the latter is put on hold in order to allow the previous processing of the messages C and D corresponding to the standard priority level. This is due to the fact that the counter value has exceeded the threshold value for one of the messages of the standard priority level. The processing of the message N is achieved after processing the messages of the standard priority level.

In the embodiment illustrated by FIG. 5, the configuration of the security module is slightly different from that of the modules of the previous embodiments. The memory contains two priority levels, one of them corresponding to a high level, referred to as 1st and the other corresponding to a lower level, referred to as Std. and called standard level. The medium priority level present in the embodiments of FIGS. 1 to 4 is thus absent in this embodiment. The counter contains durations and the incrementation of the counter is not performed by steps of one unit, but depends on a duration of the processing of the messages, as it is explained below.

The security module contains means for determining a duration. These means can be a clock and means for determining the moment between the beginning and the end of a message processing. These means for determining a duration can further comprise a clock external to the security module, said clock transmitting time or durations to the security module. A way to determine a duration comprises adding a time stamp to each message.

In reference to FIGS. 5a to 5d, the messages having a standard priority level are no more associated with an integer depending on their place in a queue, such as in the previous examples, but rather to a duration. More specifically, each message is associated to the storage period in the memory, or in other words, to the duration between the moment when this message has been stored in the memory of the security module and the current time, this current time corresponding to the moment when the security module verifies which is the next message to be processed. This duration is determined just after having finished to process a message.

The threshold value is no longer, as in embodiments shown in FIGS. 1 to 4, a "small" integer related to a number of priority messages that it is possible to process before a standard level message, without causing any problem. In the embodiment of FIG. 5, as in that of FIG. 6, the threshold value is related to a duration. In the examples disclosed, this duration is measured in milliseconds. The latter could be measured in a different unit, for instance in seconds or in an arbitrary time unit. The duration could also be measured in a value that depends on a duration, for instance a number of pulses, as far as these pulses are delivered at a regular interval.

In the example of FIG. 5, let us assume that the messages of standard priority level are all associated to a same threshold value TV that has been set to 3000 ms. This threshold value depends on the cryptoperiod and on the number of channels for which messages can be sent during this cryptoperiod. In the example of FIG. 5a, for each standard priority level message, the corresponding cell in the row referred to as AWT indicates the time value associated to this message. This time value corresponds to the actual waiting time, or in other words, to the time that the message has spent in the memory. The message B1 is for instance associated to the value 2800 ms, which means that this message has been stored 2800 ms ago. The message C1 is associated with the value 2000 ms and the value of the message B2 is of 500 ms. The message C2 is associated with the value 0, which means that it has just been stored by the security module memory.

As in the previous embodiments, the value associated with the messages stored in the memory of the security module is compared to the threshold value. According to an advantageous embodiment, the messages are stored in the form of a queue in an order corresponding to a decreasing AWT actual waiting time. It is therefore sufficient to compare the AWT value of the first message of the queue with the threshold value. According to a variant, it is also possible to compare the threshold value with the values associated with all the messages.

In the example disclosed in FIG. 5a, the highest value associated with a message is 2800 ms for the message B1. This value is lower than the threshold value which is of 3,000 ms. In this case, the messages are processed depending on their priority level. The message having the highest priority level and the oldest message stored in the memory of the security module is the message G. The latter is processed in a conventional way.

FIG. 5b shows the state of the memory after processing the message G, assuming that the process for this message has lasted 220 ms. The value associated with each standard priority level message is modified according to a predefined rule, the rule consisting in the present case, of adding the actual processing time of the previous message, which would mean measuring the actual waiting time AWT for each message. According to this example, a duration of 220 ms is thus added to each AWT value associated with the different messages of standard priority level. The value associated with the message B1 is of 2800+220=3020 ms. The value assigned to the message C1 is 2220 ms; it is 720 ms for the message B2 and 220 ms for the message C2.

The highest value, herein of 3020 ms, is compared to the threshold value, which has been set to 3000 ms. Since this threshold value has been exceeded, the message B1 is processed as a priority, before processing the message H which has a higher priority level. The processing for this message B1 is shown in FIG. 5c.

Let us assume that this process has lasted 200 ms. A value of 200 ms is then added to the value associated with each standard priority level message.

The new values associated with standard priority level messages are therefore 2420 for C1, 920 for B2 and 420 for C2. Since none of these values exceed the threshold value, the "normal" priority is respected, which means that the oldest message, having the highest priority level is processed. This message is the message referred to as H in the example shown in FIG. 5d. This embodiment has the advantage of taking into account the real time that each message of standard level has spent in the memory of the security module.

In the embodiments previously described, the threshold value was common to all messages having the standard priority level. In the embodiment shown in FIG. 6, on the contrary, a different threshold value can be assigned to different messages. This allows in particular to manage messages for channels having different cryptoperiods.

For this purpose, the memory of the security module comprises different memory areas. The security module comprises, as in the embodiment disclosed in FIG. 5, a memory area intended to receive the messages of high priority level (1st) and a memory area for storing the actual waiting time AWT. In addition to this, it comprises an incremental counter arranged to memorize the position of each message in the queue. This counter is referred to as Rg on FIG. 6.

The security module further comprises a memory area intended to store an estimated waiting time EWT, another memory area for storing the threshold value and finally a memory for storing the remaining time RT, this remaining time being defined as the difference between the threshold value TV and the actual waiting time AWT.

As shown in FIG. 6b, some messages (E2, E3, E4) have a first threshold value which is of 3000 ms in this example, while the message F2 has another threshold value, herein of 2000 ms. This threshold value is stored with each message. The parameters related to a same message are represented in the same column in FIGS. 6a and 6b. In this embodiment, the threshold value is contained in the ECM message itself, preferably in a plain text part of this message. In this way, the threshold value can be extracted from the control message ECM before having decrypted this message.

As it is disclosed in FIG. 6a, each message is associated with an actual waiting time AWT, a threshold value TV and an estimated waiting time. This estimated waiting time depends on the actual waiting time AWT and on a rank of a message in the queue, this rank being given by the value of the incremental counter for this message. Furthermore it depends on a theoretical processing time P'. According to a first embodiment, this theoretical processing time is the maximum duration necessary for processing a control message. According to a second embodiment, the theoretical processing time is an average of the actual processing times on a certain number of messages, for instance the last 16 messages. In the example of FIG. 6, this maximum processing time is of 250 ms. This maximum processing time essentially depends on the processing capacities of the security module.

The estimated waiting time EWT is equal to the actual waiting time AWT for the first message from the queue of messages of the standard priority level. For each following message from this queue, a duration corresponding to the theoretical processing time is added. The estimated processing time can be obtained by the following formula:

$$AWT=EWT+P'(Rk-1)$$

where Rk is the rank of the message in the queue.

In FIG. 6a, we thus have AWT=920+1·250=1170 for E3 and 420+2·250=920 for E4.

Finally, a last value is associated with each message, this value corresponding to the remaining time RT before reaching the threshold value TV. This remaining time is calculated by the difference between the threshold value TV and the actual waiting time AWT. For the message E2, we have TR=3000−2420=580 ms; we have 3000−920=2080 ms for E3 and 3000−420=2580 ms for E4.

In the previous embodiments, the messages of a given priority level are processed according to the FIFO principle (First In First Out). A message of a given priority level received by the security module is stored at the end of the message queue of this priority level.

In the embodiment disclosed in FIGS. 6a and 6b, the messages of the standard security level are classified according to a crescent order of remaining times RT. Thus, in the example disclosed in FIG. 6b, the message F2 has a threshold value of 2000 ms. At the moment of its reception by the security module, the remaining time is equal to the threshold value, i.e., of 2000 ms. This remaining time is smaller than the remaining time for the messages E3 and E4. The message F2 is introduced between the message E2 and the message E3, so as to be processed after the message E2, but before the message E3. This method allows to better take into account processing requirements for each single message. In particular, this allows to take into account that the messages can be associated with cryptoperiods having different durations.

In the embodiment disclosed in FIG. 6, at the end of each message processing, the values of the different parameters of messages of standard priority level are recalculated. The minimal remaining time is determined. If no message having a priority level higher than the standard level is awaiting to be processed, the message having the shortest remaining time is processed. If the minimal remaining time for a message is smaller than the threshold value, for instance zero, the message associated with this negative remaining time is processed as a priority, i.e., before any message of higher priority level. If the minimal remaining time is positive or null and if at least one message having a priority level higher than the standard level is awaiting to be processed, the normal priority is respected, namely the oldest message among the messages having the highest priority level is processed first.

It is of course possible to set a threshold value to a positive number, for instance of 300 ms and to change the processing order when the remaining time falls below this threshold value of 300 ms. This avoids, in most situations, to manage a negative time value.

The remaining time RT is calculated as being the difference between the threshold value TV and the actual waiting time AWT in the embodiment of FIG. 6.

According to a variant, it is also possible to calculate the waiting time, not using the actual waiting time, but rather the estimated waiting time. The result will be RT=TV−EWT. The estimated waiting time EWT value is calculated as in the embodiment of FIG. 5, with EWT=AWT+P' (Rk−1).

The present invention allows to ensure that the standard messages, i.e., other messages than the first messages for a given channel, are processed sufficiently early in order to provide to the user the access to the conditional access content in a continuous way. It also allows to manage messages coming from sources using the different cryptoperiods.

The present invention has been described essentially with examples using two or three priority levels and the control messages ECM. It is possible to provide a much higher number of priority level, for instance until 256, and to process, according to the same method, a combination of control messages, management messages and other messages.

The invention claimed is:

1. A method for processing messages intended to allow the access to conditional access content, wherein said method comprises:

receiving a plurality of messages by a security module comprising at least one conditional access module (CAK) and a processing module, wherein the plurality of messages are classified as belonging to at least one of a first category and a second category;

assigning a different priority level to individual messages of the plurality of messages based at least upon the classification, wherein messages classified as belonging to the first category are assigned a high priority level, and messages classified as belonging to the second category are assigned a standard priority level;

associating at least one value with at least one of the messages assigned the standard priority level, wherein the at least one value is generated based at least upon a predefined rule;

determining a threshold value for the messages assigned the standard priority level;

when the at least one value associated with the messages assigned the standard priority level does not exceed the threshold value:

processing the plurality of messages according to their priority level such that a first message assigned the high priority level is processed before the messages assigned the standard priority level; and changing the at least one value associated with the messages assigned the standard priority level according to the predefined rule; and when the at least one value associated with the messages assigned the standard priority level exceeds the threshold value:
    processing a second message assigned standard priority level before processing the messages assigned to the high priority level; and
    changing the at least one value associated with the messages assigned the standard priority level according to the predefined rule.

2. The method of claim 1, wherein the predefined rule comprises assigning an initial value during the reception of a message by the security module and modifying the initial value associated with the message after processing each message of the plurality of messages.

3. The method of claim 1, wherein the threshold value is a predetermined integer, and wherein the threshold value is exceeded when a value associated with a specific message is higher than the threshold value.

4. The method of claim 1, wherein the threshold value is a threshold duration, and wherein the threshold exceeded when a value associated with a specific message is higher than the threshold value.

5. The method of claim 1, wherein the threshold value is a duration and the threshold value is exceeded when a remaining time (RT) for a specific message is smaller than the threshold value.

6. The method of claim 2, wherein assigning the initial value comprises assigning a null value to the message.

7. The method of claim 2, wherein assigning an initial value comprises assigning a value higher than a maximum value associated with the messages assigned the standard priority level.

8. The method of claim 2, wherein modifying the initial value associated with the message comprises incrementing the initial value.

9. The method of claim 2, wherein modifying the initial value associated to the message comprises decrementing the initial value.

10. The method of claim 7, wherein the difference between the initial value assigned to the message during its reception and the maximum value associated with the messages assigned standard priority level is one unit.

11. The method of claim 8, wherein the initial value is incremented by one unit.

12. The method of claim 8, wherein the initial value is incremented by a value corresponding to a duration for processing a last processed message.

13. The method of claim 9, wherein the initial value is decremented by a value corresponding to a duration for processing a last processed message.

14. The method of claim 4, wherein the value associated with the specific message is equal to a remaining time (RT), and wherein the remaining time equals:

$$RT = TV - AWT$$

wherein TV is the threshold value; and
AWT is an actual duration spent by the specific message in a memory cooperating with the security module.

15. A system comprising:
at least one processor; and
memory encoding computer executable instructions that, when executed by the at least one processor, perform a method comprising:
    receiving a plurality of messages by a security module comprising at least one conditional access module (CAK) and a processing module, wherein the plurality of messages are classified as belonging to at least one of a first category and a second category;
    assigning a different priority level to individual messages of the plurality of messages based at least upon the classification, wherein messages classified as belonging to the first category are assigned a high priority level, and messages classified as belonging to the second category are assigned a standard priority level;
    associating at least one value with at least one of messages assigned the standard priority level, wherein the at least one value is generated based at least upon a predefined rule;
    determining a threshold value for the messages assigned the standard priority level;
    when the at least one value associated with the messages assigned the standard priority level does not exceed the threshold value:
        processing the plurality of messages according to their priority level such that a first message assigned the high priority level is processed before the messages assigned the standard priority level; and
        changing the at least one value associated with the messages assigned the standard priority level according to the predefined rule; and
    when the at least one value associated with the messages assigned the standard priority level exceeds the threshold value:
        processing a second message assigned standard priority level before processing the messages assigned to the high priority level; and
        changing the at least one value associated with the messages assigned the standard priority level according to the predefined rule.

16. The system of claim 15, wherein the predefined rule comprises assigning an initial value during the reception of a message and modifying the initial value associated with the message after processing each message of the plurality of messages.

17. The system of claim 16, wherein modifying the initial value associated with the message comprises incrementing the initial value.

18. The system of claim 16, wherein modifying the initial value associated the message comprises decrementing the initial value.

19. The system of claim 17, wherein the initial value is incremented by a value corresponding to a duration for processing a last processed message.

20. The system of claim 18, wherein the initial value is decremented by a value corresponding to a duration for processing a last processed message.

21. A receiver comprising:
at least one processor; and
memory encoding computer executable instructions that, when executed by the at least one processor, perform a method comprising:
    receiving a plurality of messages by a security module comprising at least one conditional access module (CAK) and a processing module, wherein the plurality of messages are classified as belonging to at least one of a first category and a second category;
    assigning a different priority level to individual messages of the plurality of messages based at least upon the classification, wherein messages classified as belonging to the first category are assigned a high priority level, and messages classified as belonging to the second category are assigned a standard priority level;

associating at least one value with at least one of the messages assigned the standard priority level, wherein the at least one value is generated based at least upon a predefined rule;

determining a threshold value for the messages assigned the standard priority level;

when the at least one value associated with the messages assigned the standard priority level does not exceed the threshold value:
- processing the plurality of messages according to their priority level such that a first message assigned the high priority level is processed before the messages assigned the standard priority level; and
- changing the at least one value associated with the messages assigned the standard priority level according to the predefined rule; and when the at least one value associated with the messages assigned the standard priority level exceeds the threshold value:
- processing a second message assigned standard priority level before processing the messages assigned to the high priority level; and
- changing the at least one value associated with the messages assigned the standard priority level according to the predefined rule.

* * * * *